B. S. M. JARCHOW.
TRAFFIC SIGNAL.
APPLICATION FILED DEC. 1, 1917.
1,319,284.
Patented Oct. 21, 1919.
2 SHEETS—SHEET 1.
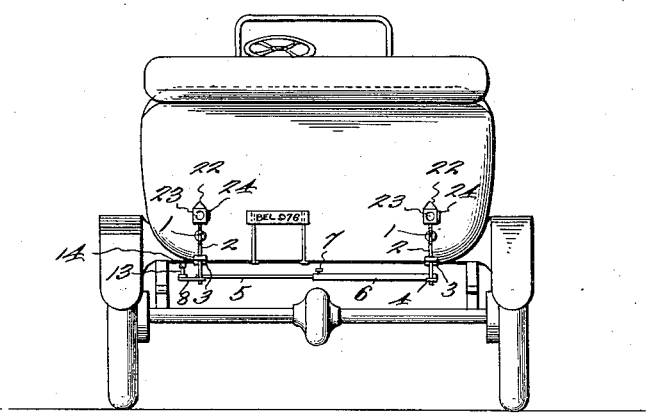
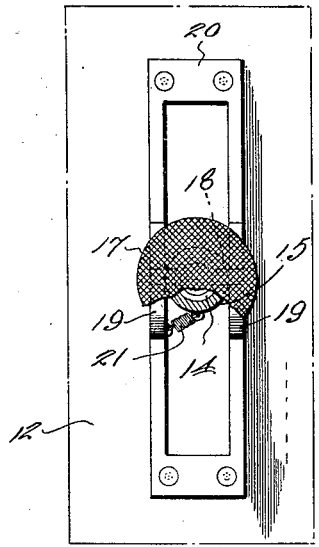
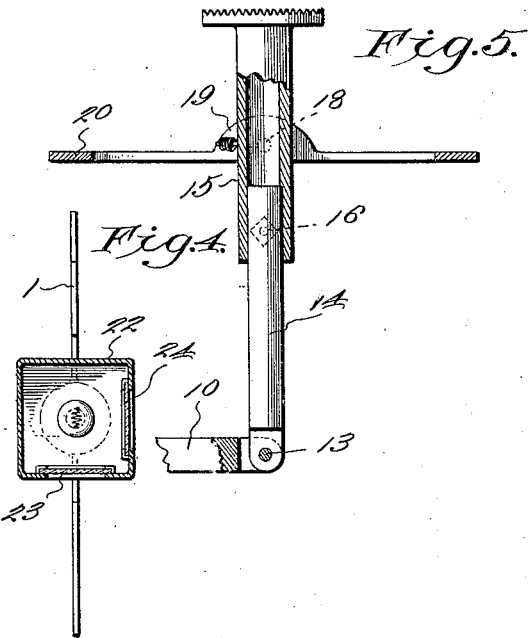
Witnesses
W. May. Duvall
R. M. Smith.
Inventor
B. S. M. Jarchow,
By Victor J. Evans
Attorney

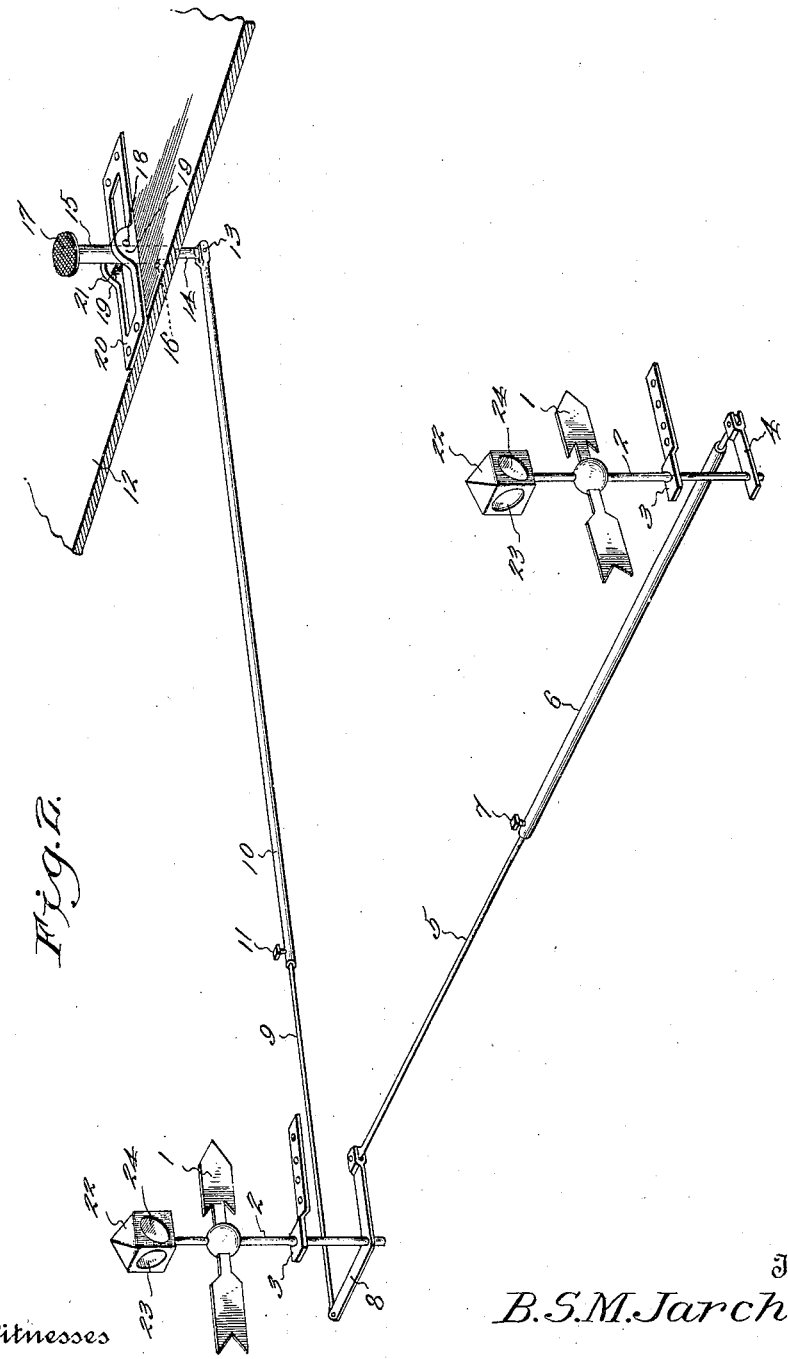

UNITED STATES PATENT OFFICE.

BENJAMIN S. M. JARCHOW, OF SOUTH CHICAGO, ILLINOIS.

TRAFFIC-SIGNAL.

1,319,284. Specification of Letters Patent. Patented Oct. 21, 1919.

Application filed December 1, 1917. Serial No. 204,904.

*To all whom it may concern:*

Be it known that I, BENJAMIN S. M. JARCHOW, a citizen of the United States, residing at South Chicago, in the county of Cook and State of Illinois, have invented new and useful Improvements in Traffic-Signals, of which the following is a specification.

This invention relates to traffic signals the object in view being to provide simple and reliable means for signaling the drivers of vehicles in rear of a motor vehicle equipped with the signaling apparatus so as to prevent rear end collisions. The signal is designed to inform a following vehicle as to the direction in which the vehicle equipped with the signal is about to turn; also when the vehicle is going to come to a stop.

Another object of the invention is to provide signal operating means which may be controlled by one foot of the operator, making it unnecessary for the operator to move his hands from the wheel. The signal and the operating means therefor are returned to their initial positions when the controlling member is released. The signaling apparatus comprises indicating means for use in the day time and also indicating means for use at night.

With the above and other objects in view, the invention consists in the novel construction, combination and arrangement of parts, herein described, illustrated and claimed.

In the accompanying drawings:—

Figure 1 is a rear elevation of a motor vehicle showing a pair of rear signals carried thereby.

Fig. 2 is a perspective view of the signaling apparatus as a whole detached from the vehicle.

Fig. 3 is a plan view of the foot lever by means of which the signals are operated.

Fig. 4 is a horizontal section through one of the signaling lamps.

Fig. 5 is a fragmentary vertical section of the pedal and adjacent parts.

The signaling apparatus comprises two signaling members 1 which are shown in the form of arrows and which are used as day signals. The signaling members 1 are mounted fast on vertical rock shafts 2 and are therefore adapted to turn on vertical axes, the signaling members 1 being horizontally disposed and normally pointing in a straight forward direction.

The rock shafts 2 are mounted in bearing members or brackets 3 which are secured to the under side of the body of the vehicle. The shafts 2 extend below the bottom of the vehicle to provide for placing the operating connections below the body. The post or shaft 2 at one side has fixedly connected thereto an operating arm 4 to which is connected one end of a longitudinally extensible connecting rod comprising two telescopic members 5 and 6, the member 6 being of tubular formation and adapted to receive the member 5 which may be inserted more or less in the member 6 and secured in fixed relation thereto by means of a set screw 7. At its other end said longitudinally extensible connection is attached pivotally to one arm of a bell crank lever 8 which is fast at its elbow on the post or shaft 2 at that side of the vehicle. Connected to the other arm of the lever 8 is another longitudinally extensible connecting rod comprising telescopically related members 9 and 10 which are adjustable longitudinally in relation to each other and adapted to be held fixed in relation to each other by a set screw 11.

The last named connecting rod extends forward to a point beneath the floor 12 of the operator's compartment where it is connected by a pivot 13 to the lower member 14 of a longitudinally extensible telescopic foot lever which comprises in addition to the member 14 a tubular member 15, the members 14 and 15 being adjustable in relation to each other and held fixed in relation to each other by a set screw 16 located below the floor of the vehicle. The construction just referred to provides for lengthening and shortening the foot lever so that greater or less amplitude of movement may be provided for the head 17 of the lever according to the convenience of the operator. The lever 17 is mounted on a horizontal pivot pin 18 carried by upwardly extending ears 19 on a floor plate 20 secured to the floor 12 and formed with a central slot 21 to provide for the swinging movements of the foot lever. A lever centering and return spring 21 is connected at one end to the foot lever and at the other end to one of the ears 19 of the floor plate 20. The spring 21 acts to return the foot lever to a substantially upright position when the operator removes his foot from the head 17, the latter being preferably roughened or serrated to give the necessary frictional hold for the operator's foot.

The posts or shafts 2 are extended above the arrows 1 and each of said posts has mounted on the upper end thereof a lamp 22 which turns with the respective post and simultaneously with the respective day light indicating member 1. Each lamp 22 has a green panel 23 which normally faces in a rearward direction and is provided in the opposite sides thereof with red panels or windows 24 which normally face laterally in opposite directions. When the signal is turned either to the right or to the left, one of the red lights is displayed, this being true of both lamps 22. Thus the operator by means of the signaling apparatus may indicate either in the day time or at night the direction in which he intends to turn. In case he intends to bring the machine to a stop he rocks the foot lever back and forth thus flashing the red lights of the rear signaling lamps thus cautioning a following vehicle to slow down.

The signal apparatus hereinabove described is of simple construction, is capable of being applied to any vehicle and adjusted to suit such vehicle and will add greatly to the safety of traffic in general. It is intended to place the lamps 22 at opposite sides of the license plate of the machine so that said plate will be illuminated by the lamps at night time. It is not necessary for the operator to remove his hands from the wheel in order to operate the signaling apparatus.

I claim:—

In a traffic signal for motor vehicles, a pair of oscillatory vertical shafts mounted upon a vehicle in transversely spaced relation to each other, signaling members mounted fast on said shafts and extending in the same direction, an arm extending from one of said shafts, a bell crank lever fast on the other shaft, and adjustable connecting rod extending from said arm to one arm of said lever, a manually operable lever, and a connecting rod attached at one end to the other arm of said bell crank lever, and attached at its other end to said manually operable lever.

In testimony whereof I affix my signature.

BENJAMIN S. M. JARCHOW.

Copies of this patent may be obtained for five cents each, by addressing the "Commissioner of Patents, Washington, D. C."